United States Patent [19]

Enzinger et al.

[11] 4,045,262
[45] Aug. 30, 1977

[54] METHOD OF MAKING LAMINAR MATERIAL HAVING A BASE OF BONDED WOOD PARTICLES

[75] Inventors: Hans Joachim Enzinger, Oerlinghausen, Germany; Hans Fechner, Kortrijk, Belgium

[73] Assignee: Feldmuhle Anlagen und Produktionsgesellschaft mit beschrankter Haftung, Dusseldorf-Oberkassel, Germany

[21] Appl. No.: 685,909

[22] Filed: May 12, 1976

[30] Foreign Application Priority Data

May 28, 1975 Germany ............... 2523670

[51] Int. Cl.² ............ B32B 31/00; B05D 3/12
[52] U.S. Cl. ............ 156/62.2; 156/277; 156/583; 427/359; 427/361; 427/362; 427/366; 428/318
[58] Field of Search ......... 156/62.2, 582; 427/194, 427/201, 359, 361, 362, 366; 428/318

[56] References Cited
U.S. PATENT DOCUMENTS

| 3,078,510 | 2/1963 | Rowe | 427/195 X |
|---|---|---|---|
| 3,300,361 | 1/1967 | Brown | 156/62.2 X |
| 3,301,726 | 1/1967 | Matsukata | 156/62.2 X |
| 3,607,489 | 9/1971 | Helgesson | 156/62.2 X |
| 3,737,351 | 6/1973 | Ettel | 156/62.2 |
| 3,874,962 | 4/1975 | Gersbeck et al. | 156/62.2 |
| 3,905,847 | 9/1975 | Black | 156/62.2 |
| 3,930,110 | 12/1975 | Shoemaker et al. | 156/62.2 X |
| 3,933,558 | 1/1976 | Takahata et al. | 427/361 X |
| 3,968,308 | 7/1976 | Buschfeld et al. | 156/62.2 X |

*Primary Examiner*—Ronald H. Smith
*Assistant Examiner*—Shrive P. Beck
*Attorney, Agent, or Firm*—Hans Bermann

[57] ABSTRACT

A laminar board having a base of bonded wood particles carrying a decorative facing is produced by sequentially moving a carrier web through a loading zone and a press zone. The carrier web consists essentially of paper impregnated with a synthetic resin composition and having a permeability to water vapor of at least 1000 g/m²/day. A layer of loose wood particles intimately mixed with a bonding agent is superimposed on the carrier web in the loading zone, and the resulting layered material is subjected in the press zone to a temperature and pressure sufficient to bond the loose particles to each other by the bonding agent in a dense structure and simultaneously to bond the particles to the carrier web by the bonding agent and/or the synthetic resin composition.

10 Claims, 3 Drawing Figures

METHOD OF MAKING LAMINAR MATERIAL HAVING A BASE OF BONDED WOOD PARTICLES

This invention relates to plate material consisting of bonded wood particles carrying a surface layer of paper impregnated with synthetic resin composition, and particularly to a process of producing such a laminar material in continuous length.

It has been disclosed in Ettel U.S. Pat. No. 3,737,351 to manufacture chip board in continuous lengths by scattering a mixture of binder and wood chips on a continuously moving metal belt, and to move the belt with the layer of wood particles carried thereon about the circumference of a heated drum while backed by pressure rollers, the pressure and temperature of the particulate layer being sufficient to activate the binder and to compress the chips into a coherent board.

The known method is being used successfully on an industrial scale, and the chip boards so produced at low cost have found a wide range of applications where more costly plywood had been used before.

The appearance of the bare chip boards is not adequate for many purposes in which other properties of the boards would be valuable, and they have been coated with adhesively fastened, decorative layers of paper, fabric, metal, or even wood veneer in a second manufacturing step which significantly increases the cost of the product.

It has been proposed in U.S. Pat. No. 3,874,962 to Gersbeck et al to produce a coated chip board in a single stage by applying a foil of polyvinyl chloride or melamine-impregnated paper to the mixture of binder and wood chips on the metal belt before the belt is pressed against the heated drum in the afore-described process, the foil or paper being applied to the face of the layer directed toward the drum.

The wood chips necessarily contain water, and the temperature in the layer traveling over the circumference of the heated drum must exceed 100° C if consolidation of the chips by the binder is to be achieved within a practical period. It has been found that the steam generated from the water present cannot escape readily from the laminar product released from the drum through the practically impervious decorative layer. It weakens any bond that may be formed by the binding agent between the chips and the decorative surface layer, so that it may cause blistering and other immediately visible defects, and others which appear during normal use.

It is a primary object of this invention to avoid the harmful effects of heat on the bond between a chipboard and a decorative surface layer applied thereto.

It has been found that a satisfactorily coated material of the type described can be produced when the decorative surface layer consists essentially of paper impregnated with a synthetic resin composition and having a permeability to water vapor of at least 1000 grams per square meter per day, and if the impregnated paper is used as a carrier web on which the wood particles intimately mixed with a bonding agent are superimposed as a top layer prior to engagement by the heated drum.

In its more specific aspects, the instant invention provides a process of producing a laminar material in continuous lengths in which a carrier web is moved sequentially and continuously through a loading zone and through a press zone. The carrier web consists essentially of paper impregnated with a synthetic resin composition and has a permeability to water vapor of at least 1000 grams per square meter per day. Loose wood particles, such as fibers, chips, flakes, or wood flour, intimately mixed with a bonding agent therefor are superimposed on the carrier web in the loading zone to form a layer, and the carrier web and the superimposed layer are subjected to a temperature greater than 100° C and to a pressure sufficient to bond the loose particles to each other by the bonding agent in a dense structure and simultaneously to bond the particles to the carrier web by the bonding agent and/or the synthetic resin composition.

Water vapor permeability was determined in all instances by German Industrial Standard "DIN 53122 Page 1."

In another aspect, the invention provides apparatus for performing the afore-described process in which a heated drum is mounted for rotation about its axis. A flexible metal band having two major faces extends in a continuous loop and is guided in a path having a first portion in which one of the major faces is directed upward, and a second portion in which the band is trained about the drum, the one face being directed toward the drum and being urged toward the drum. Means are provided for feeding a continuous web of paper to the one major band face in the first path portion for movement of the web with the band from the first to the second portion of the path. Means are further provided for scattering particulate material on the web in the first path portion for movement of the particulate material with the band from the first to the second path portion in which the particulate material is radially interposed between the web and the drum.

Other features, additional objects, and many of the attendant advantages of this invention will readily be appreciated as the same becomes better understood by reference to the following detailed description of preferred embodiments when considered in connection with the appended drawing in which.

Figure 1:
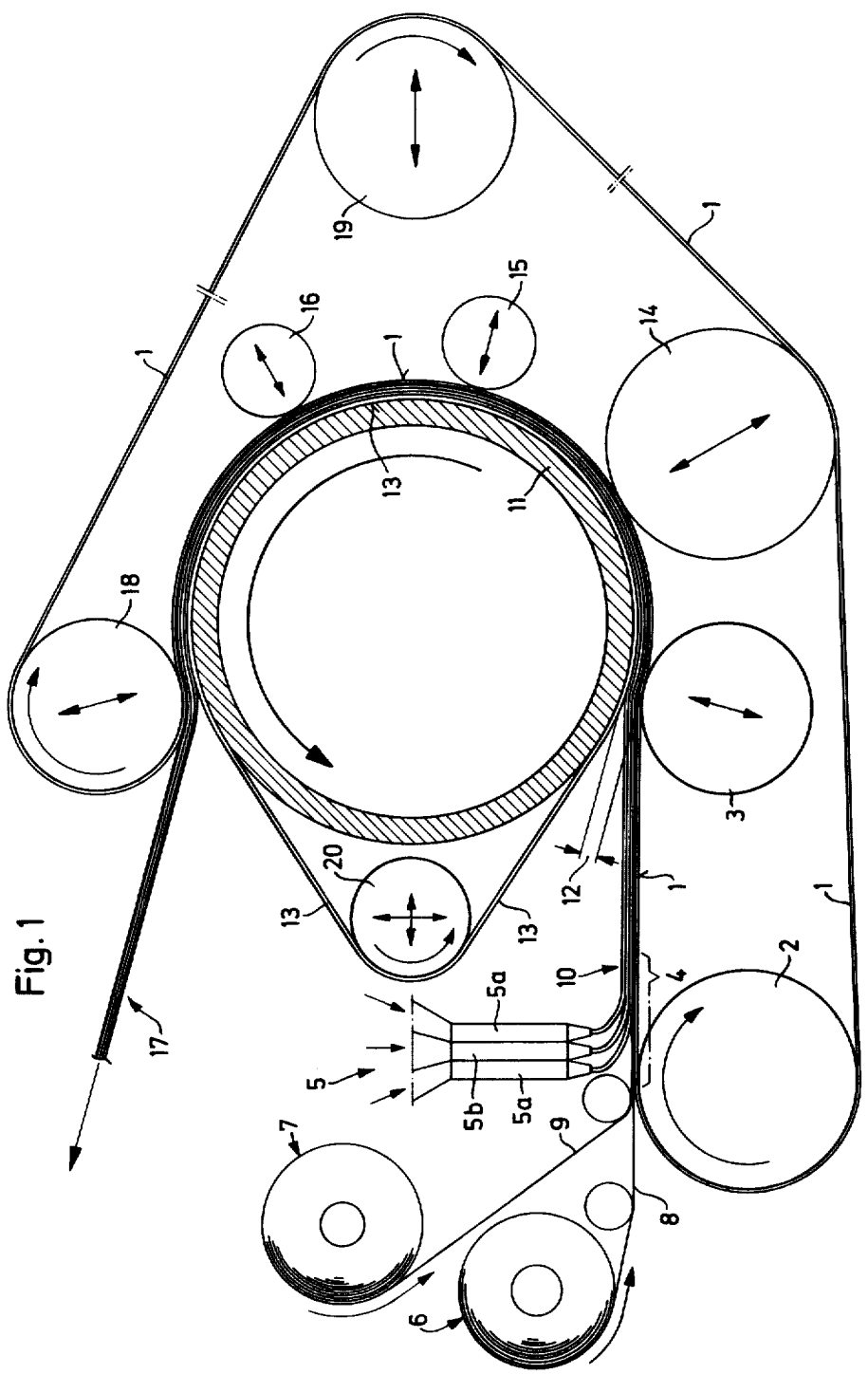
FIG. 1 shows apparatus for performing the process of the invention in simplified side-elevation and partly in section.

Referring initially to FIG. 1, there is seen a wide, flexible, continuous steel band 1 which is trained over a reversing pulley 2 in an arc of about 180° and runs horizontally from the pulley 2 to an internally heated receiving cylinder or pulley 3, the tangential run of the band 1 adjacent the reversing pulley 2 defining a loading zone 4 in which the band 1 is loaded with wood particles from a spreading device 5.

Figure 2:
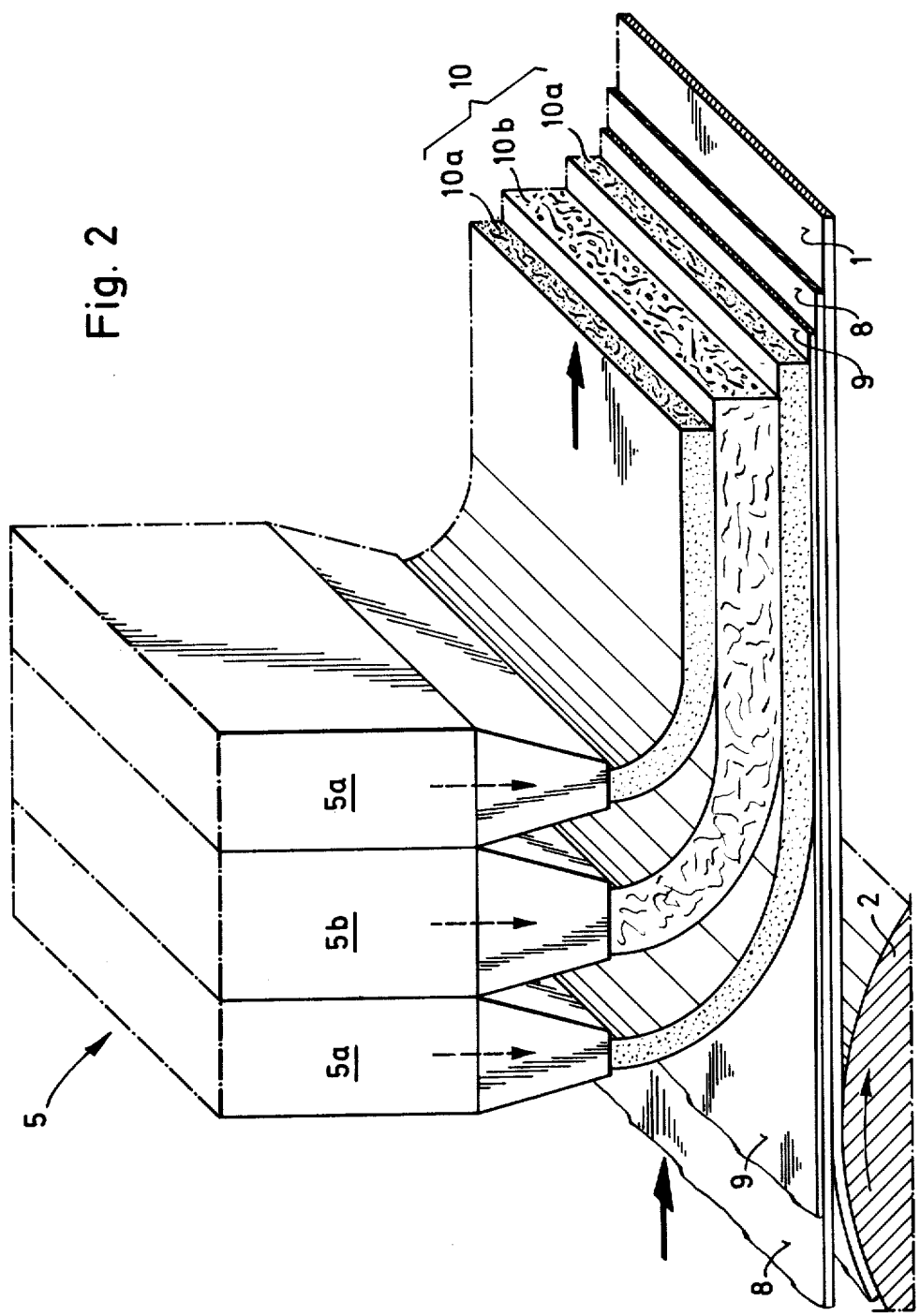
FIG. 2 shows a portion of the apparatus of FIG. 1 in a perspective and partly sectional, enlarged view.

Reels 6, 7 respectively release continuous webs of burlap 8 and paper 9 which are guided toward the pulley 2 in such a manner that the burlap 8 is sandwiched between the steel band 1 and the upwardly exposed paper 9 in the loading zone 4. As is better seen in FIG. 2, the spreading device 5 includes three bottom-discharging bins of which the two outer bins 5a are identical in dimensions and contents and different in both aspects from the central bin 5b. The bottom opening of each bin is elongated transversely to the direction of movement of the band 1, and the three openings are speedly juxtaposed in the direction of movement and dimensioned so as to discharge a thinner bottom layer 10a, a thicker middle layer 10b, and another thin top layer 10a on the paper web 9, the wood particles in the layers 10a being smaller than those in the layer 10b, and the loose particles of each layer being intimately mixed with a bonding agent.

The steel band 1 and the laminar material supported thereon enter the nip 12 between the receiving pulley 3 and a rotating, heated drum 11, and the triple layer 10 of wood particles is held in contact with the drum 11, driven in a conventional manner, not specifically shown, by idler cylinders 14, 15, 16, 18 spaced about the axis of rotation of the drum 11 and radially adjustable for controlling the contact pressure exerted by the idler cylinders on the steel band 1.

The pressure pulley or cylinder 14 is internally steam-heated, and radiant heaters, conventional in themselves and not shown, may be provided for additionally heating the steel band 1 in the press zone along the circumference of the drum 1.

Another continuous steel band 13 is interposed between the drum 11 and the layer of wood fibers 10 and may be tensioned by a pulley 20 in a manner indicated by two crossed double arrows. The steel band 1 is trained over the reversing cylinder 18 and is guided back to the receiving pulley 3 by a tensioning pulley 19 and the afore-mentioned pressure cylinder 14.

Figure 3:
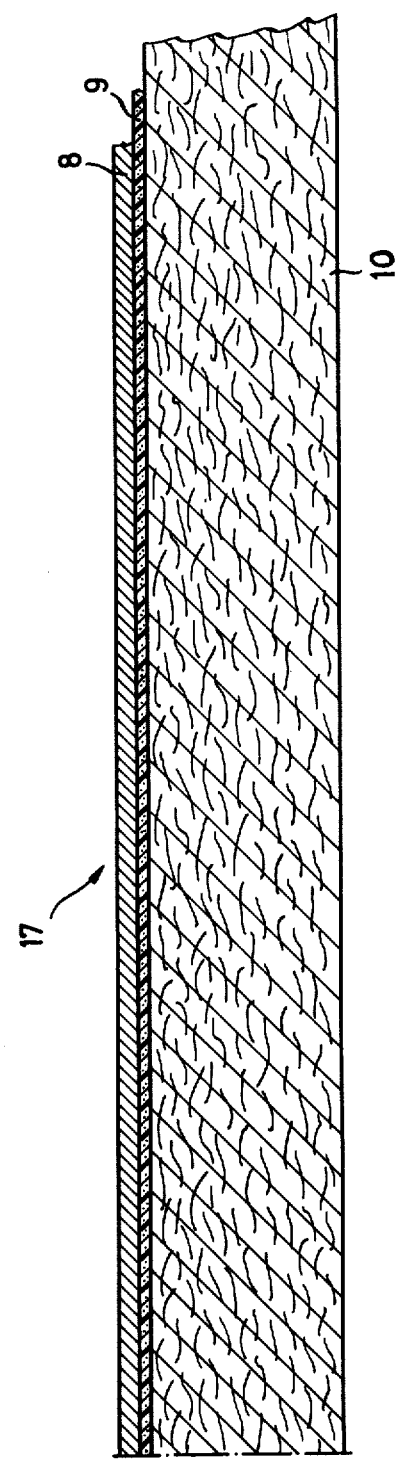
FIG. 3 illustrates a coated fiberboard prepared on the apparatus of FIGS. 1 and 2 in cross section.

A cured, coated fiberboard 17 separates from the steel bands 1, 13 in the nip between the drum 11 and the reversing cylinder 18 and is drawn off in continuous length in a known manner, not specifically illustrated. As is seen in FIG. 3, it consists of a relatively heavy layer 10 of bonded wood particles, such as chips or fibers, an outer layer 8 of decorative burlap, and a paper layer 9 impregnated with cured resin and connecting the fabric to the particle board base.

The operation of the apparatus illustrated and of variations thereof will now be described with reference to specific Examples.

EXAMPLE 1

An aqueous suspension of cotton linters, cellulose fibers, and polyamide fibers in a weight ratio of 2:2:1 was fed to the Fourdrinier wire of a paper making machine at a rate to produce a web having an approximate weight of 200 g/m². The web was reinforced by immersion in an aqueous, synthetic resin dispersion containing 42.4% solids and prepared from a 55.7% latex of butadiene-styrene copolymer modified to contain carboxyl groups, a non-ionic, surface active, fatty acid condensation product, a functional derivative of an organopolysiloxane, and ammonium chloride, the components other than the latex contributing 16.6% of the solids in the synthetic resin composition. The latex was coagulated at approximately 35° C, and the web was dried. It has a bulk density of 0.395 g/cm² and contained fibers and resin composition in a weight ratio of 1:1 on a dry basis.

The air permeability determined by German Industrial Standard "DIN 53887" was 596 l/minutes. The water vapor permeability was therefore not measurable and far above 1000 g/m²/day.

The web was trimmed to a width of 2 m, imprinted with a pattern imitating a linen fabric, and reeled. It was then fed to the apparatus shown in the drawing for loading with three consecutive layers of wood chips. The chips in the top and bottom layers had a particle size up to 0.5 mm and contained 12% to 13% uniformly distributed bonding agent based on the combined dry weight of the wood and bonding agent which was a stage A urea-formaldehyde resin. The layers formed from the fine chips had each bulk density of 201 kg/m³. The central layer consisted of chips and fibers retained by a screen having 0.5 mm openings, but passing through 30.0 mm openings and intimately mixed with the same urea-formaldehyde precondensate in an amount of 12%. The coarse central layer had a bulk density of 94 kg/m³.

The temperature of the calender drum 11 was controlled at 150° ± 2° C, and that of the receiving pulley 3 at 200° ± 2° C. The pressure exerted on the laminar structure passing between the drum 11 and the pulley 3 was approximately 225 kg, and that between the drum 11 and the reversing pulley 19 350 kg per meter of axial drum length. The bands 1, 13 and the laminar material contained therebetween traveled through the press zone at a linear speed of 10 m/min., which permitted practically complete curing of the urea-formaldehyde resin by the ammonium chloride migrating from the paper web 9.

The fiberboard carrying a textile-like coating produced in the manner outlined above had a thickness of 4.5 mm and a density of 0.725 g/cm³. It provided an attractive wall paneling.

EXAMPLE 2

A paper web weighing 70 g/m² was prepared on a Fourdrinier machine from a fiber suspension containing 40% (by weight) groundwood without sizing, and was impregnated by immersion in an aqueous suspension of a melamine-formaldehyde precondensate (Madurit MW 638 of Hoechst) which did not contain a hardener for the resin. The impregnated paper was dried to a residual moisture content of 8 – 8.5%. It weighted 150 g/m² and had a water vapor permeability of 1420 g/m²/day. The impregnated paper, which did not contain any filler, was trimmed to a width of 2 m, reeled, and fed to the nip of the drum 11 and pulley 3 in the illustrated apparatus over a web of loosely woven burlap having the same width and weighing 210 g/m².

A layer of wood chips or fibers was deposited on the exposed surface of the impregnated paper from two non-illustrated nozzles discharging the chips or fibers toward the horizontal paper surface in streams of air coextensive with the paper width, one stream being directed in the direction of paper movement, the other in the opposite direction. The particle size distribution of the wood chips or fibers was 3.2% below 0.2 mm, 9.9% 0.2 – 0.5 mm, 18.7% 0.5 – 1.0 mm, 31.9% 1 – 2 mm, 11.2% 2 – 3 mm, and 25.1% 3 – 32 mm. The larger particles were deposited mainly below the closely juxtaposed nozzles while the smaller and lighter particles moved farther away with the respective air streams, thereby producing a layered structure in which the top and bottom consisted of fines and the center or core of coarser material. The wood chips or fibers were intimately mixed with 12% bonding agent before being deposited on the paper, as described in Example 1.

A fiberboard carrying a surface coating of burlap over an intermediate paper layer was produced at a continuous rate of 7.5 m/min. in a procedure not otherwise different from that described in the preceding Example. It has an overall thickness of 6 mm. Panels cut from the continuous product are suitable for use in furniture or as wall covers.

EXAMPLE 3

An impregnating bath was prepared by mixing 400 kg aqueous 50% solution of a urea-formaldehyde precondensate (Kaurit 210, BASF) having a specific gravity of 1.21 and a pH of 7 - 8, 1.6 kg chloramine hardener, 1.6 kg anionic wetting agent (Hypersal XT 790, Hoechst), and 380 liters water.

6 Kilograms each of two anionic, brown dyes (Luganil Brown N3G and NGR, BASF) were dissolved in 30 liters water each at 60° C, and the dye solutions were mixed with the impregnating bath.

Paper free from sizing was prepared as described in the preceding Examples and contained 40% groundwood. It was imprinted with a black pattern simulating the fiber structure of rosewood and then passed at a rate of 30 m/min. through the colored impregnating mixture. The paper thus saturated was dried in a continuous dryer maintained at 180° C to a residual moisture content of 7 - 8%. It had a water vapor permeability of 1140 g/m$^2$/day, and was employed in the otherwise unchanged procedure of Example 1 to produce a thin, coated fiberboard having the appearance of a rosewood panel and suitable for furniture making.

The process of this invention can be performed with paper not containing a synthetic resin impregnant, but the product obtained offers no significant advantage over bare chip board, and is not worth the added cost, small though it may be. The impregnating resin is thus an essential component of the laminar product of this invention and contributes mechanical strength to the board and other well known, desirable properties not heretofore available without an additional processing step.

When released from the apparatus illustrated, the hot resin impregnant is still sufficiently permeable to steam to avoid blistering or other weakening of the bond between the wood base and the paper layer which is due mainly to the bonding agent originally applied to the wood particles. Depending on the nature of the impregnating resin in the paper, the resin may also contribute to the bond.

Because of their superior mechanical and chemical properties, thermosetting resins are preferred as impregnants. They enter the press zone in the A-stage, as illustrated in Example 3 with respect to a urea-formaldehyde precondensate, or in the B-stage, as in the melamine-formaldehyde precondensate of Example 2. The temperature and dwell time in the press zone are selected to convert the thermosetting material to the C-stage without unduly impairing the water vapor permeability of the hot, impregnated paper.

The nature and dimensions of the paper prior to impregnation have an important bearing on water vapor permeability and are chosen accordingly without sacrificing necessary mechanical and other properties of the paper layer in the finished product.

Sizing and fillers generally reduce water vapor permeability and are preferably avoided in the base paper employed which should consist essentially of fibrous material only prior to impregnating. Wood fibers significantly enhance permeability when present in amounts of 30% or more and permit the use of paper weighing as much as 120 g/m$^2$. For many applications, the lower limit of useful base paper weight is 50 g/m$^2$. The dry weight of the synthetic resin composition may add 60 to 130 g/m$^2$ to the proper impregnated paper.

The preferred conditions to which the laminar structure is to be subjected in the press zone are of the same order as in the afore-cited processes of the prior art. The pressure in the nip between the drum 11 and the pressure cylinder 14 is preferably between 220 and 280 kg/cm of axial drum length, and the pressure is maintained at similar values elsewhere by the calibrating idlers 15, 16 and the reversing cylinder 18. The temperature is raised to a value between 120° and 230° C in the nip between the drum 11 and the receiving cylinder 3, and is maintained within this range throughout the press zone for a period of 30 to 90 seconds by internally heating as many of the cylinders 14, 15, 16, and 18 as is needed, and by further applying heat to the outer, exposed surface of the traveling band 1, as is conventional in itself.

The laminar structures of the invention do not show any tendency to warp when released from the apparatus shown in the drawing although a paper coating is applied to only one face of the wood particle base. This is thought to be due in part to the fact that the paper layer travels on the outside of the particle layer about the drum 11, but the water vapor permeability of the impregnated paper at the point of release from the drum 11 is also thought to be relevant to the observed effect. A significant difference in moisture content does not develop across the wood layer because of release of water vapor at different rates from its two major faces.

It should be understood, of course, that the foregoing disclosure relates only to preferred embodiments of the invention, and that it is intended to cover all changes and modifications in the examples of the invention herein chosen for the purpose of the disclosure which do not constitute departures from the spirit and scope of the invention set forth in the appended claims.

What is claimed is:

1. A process of producing a laminar material in continuous lengths which comprises:
    a. sequentially and continuously moving a paper web through a loading zone and through a press zone,
        1. said web consisting essentially of fibrous material impregnated with a synthetic resin composition, being free from sizing and filler, and having a permeability to water vapor of at least 1000 grams per square meter per day;
    b. superimposing on said web in said loading zone loose wood particles intimately mixed with a bonding agent for said particles to form a layer on said web; and
    c. subjecting the web and the superimposed layer during said moving through said press zone to a temperature greater than 100° C and to a pressure sufficient to bond said loose particles to each other by said bonding agent in a dense structure and simultaneously to bond said particles to said web by at least one of said bonding agent and said synthetic resin composition.

2. A process as set forth in claim 1, wherein said web and the superimposed layer are confined between surfaces impermeable to water vapor while being subjected to said temperature and said pressure, and said web is relieved of said pressure at said temperature by release from one of said surfaces, the water content of said impregnated fibrous material being sufficient to cause partial failure of the bond between said particles and said web after said relieving in the absence of said permability.

3. A process as set forth in claim 2, wherein said fibrous material includes at least 30% wood fibers and has a dry weight of 50 - 120 g/m$^2$, the dry weight of said synthetic resin composition being 60 - 130 g/m$^2$.

4. A process as set forth in claim 3, wherein said web is prepared prior to said moving by saturating said paper with an aqueous solution of a urea-formaldehyde precondensate and of a hardener for said precondensate, and drying the saturated paper to a residual moisture content of 6 to 10 percent at a temperature sufficiently low to prevent curing of said precondensate.

5. A process as set forth in claim 4, wherein said paper prior to said saturating is imprinted with a decorative pattern.

6. A process as set forth in claim 3, wherein said carrier web is prepared prior to said moving by impregnating said paper with a melamine-formaldehyde precondensate.

7. A process as set forth in claim 2, wherein said web and said superimposed layer are moved in said press zone through a nip between a heated drum rotating about the axis thereof and a cylinder, and are subjected in said nip to a pressure of 220 to 280 kg/cm of axial length of said drum.

8. A process as set forth in claim 2, wherein said temperature is between 120° and 230° C, and said web and said layer are subjected to said temperature for 30 – 90 seconds.

9. A process as set forth in claim 2, wherein the synthetic resin in said composition is a thermosetting resin in the A stage or B stage, and said temperature and pressure are sufficient to convert said resin to the C stage.

10. A process set forth in claim 9, wherein said bonding agent includes a curing agent for said resin, said temperature and pressure being sufficient to cause migration of the curing agent into said paper.

* * * * *